US012672603B2

(12) United States Patent
     Dickson

(10) Patent No.:    US 12,672,603 B2
(45) Date of Patent:        Jul. 7, 2026

(54) CONFIGURABLE LIFT ACTUATOR FOR LAWN MOWER CUTTING UNIT

(71) Applicant: Textron Inc., Providence, RI (US)

(72) Inventor: William Christopher Dickson, Stowmarket (GB)

(73) Assignee: Textron Inc., Providence, RI (US)

( * ) Notice: Subject to any disclaimer, the term of this patent is extended or adjusted under 35 U.S.C. 154(b) by 403 days.

(21) Appl. No.: 18/341,830

(22) Filed: Jun. 27, 2023

(65) Prior Publication Data

US 2025/0000017 A1      Jan. 2, 2025

(51) Int. Cl.
     A01D 34/54      (2006.01)
     A01D 34/44      (2006.01)
     A01D 34/62      (2006.01)
     A01D 75/30      (2006.01)
     *A01D 101/00*      (2006.01)

(52) U.S. Cl.
     CPC ............ A01D 34/54 (2013.01); A01D 34/44 (2013.01); A01D 75/306 (2013.01); *A01D 34/62* (2013.01); *A01D 2101/00* (2013.01)

(58) Field of Classification Search
     CPC ...... A01D 34/54; A01D 34/44; A01D 75/306; A01D 34/62
     See application file for complete search history.

(56) References Cited

U.S. PATENT DOCUMENTS 5,042,236 A * 8/1991 Lamusga ............... A01D 75/30
                                                             D15/15
5,309,699 A * 5/1994 Ehn, Jr. ................. A01D 75/30
                                                        56/DIG. 15
5,406,778 A * 4/1995 Lamb ..................... A01D 34/44
                                                             56/11.9
6,412,258 B1 * 7/2002 Doerflinger .......... A01D 75/306
                                                             56/15.8
6,928,798 B2     8/2005 Hensley et al.
7,013,626 B1     3/2006 Strope
7,293,398 B2    11/2007 Koehn
7,540,134 B1     6/2009 Reich
7,540,135 B2     6/2009 Strope
7,568,331 B2     8/2009 Reichen et al.
7,614,207 B2    11/2009 Elhardt et al.
7,654,065 B2     2/2010 Phillips
                              (Continued)

FOREIGN PATENT DOCUMENTS

CN        211792946 U      10/2020
CN        112470679 A       3/2021
                        (Continued)

*Primary Examiner* — Joseph M Rocca
*Assistant Examiner* — Julia C Tran
(74) *Attorney, Agent, or Firm* — Akona IP PC

(57)                    ABSTRACT

A cutting assembly for a mower includes a cutting unit comprising a plurality of blades; a lift arm including a float plate, wherein the cutting unit is connected to the lift arm via a yoke and wherein a slot is provided in the float plate; a lift actuator comprising a lift pin disposed in the slot; and a control system for selectively controlling a position of the lift actuator; wherein the position of the lift actuator comprises one of a first operating position, in which the lift pin is positioned proximate a center of the slot and a second operating position, in which the lift pin is positioned between the center of the slot and an end of the slot proximate a body of the actuator.

17 Claims, 8 Drawing Sheets

(56) References Cited

U.S. PATENT DOCUMENTS

| | | |
|---|---|---|
| 7,654,066 B2 | 2/2010 | Link et al. |
| 7,669,395 B2 | 3/2010 | Wehler et al. |
| 7,716,906 B2 | 5/2010 | Swart |
| 7,716,907 B2 | 5/2010 | Joliff et al. |
| 7,971,417 B2 | 7/2011 | Link |
| 8,091,329 B2 | 1/2012 | Schick |
| 8,438,822 B2 | 5/2013 | Lancaster |
| 9,693,501 B2 | 7/2017 | Giere |
| 9,861,035 B2 | 1/2018 | Kruckeberg et al. |
| 10,645,873 B2 | 5/2020 | Reichard |
| 10,834,869 B2 | 11/2020 | Walker |
| 11,019,763 B2 | 6/2021 | Walsh et al. |
| 11,206,759 B2 | 12/2021 | Gust et al. |
| 11,310,961 B2 | 4/2022 | Clontz et al. |
| 2005/0005586 A1* | 1/2005 | Schmidt ................. A01D 34/62 |
| | | 56/249.5 |
| 2007/0256400 A1* | 11/2007 | Henson .................. A01D 34/62 |
| | | 56/6 |
| 2014/0331630 A1* | 11/2014 | Phillips ................. B60T 8/1755 |
| | | 56/10.2 H |
| 2015/0282424 A1* | 10/2015 | Shida ........................ E02F 9/26 |
| | | 700/275 |
| 2015/0351318 A1* | 12/2015 | Iyasere ................ A01D 34/006 |
| | | 56/10.2 A |
| 2016/0106020 A1* | 4/2016 | Akahane ................ A01D 34/66 |
| | | 56/17.1 |
| 2016/0316619 A1 | 11/2016 | Johanek et al. |
| 2020/0077581 A1 | 3/2020 | Carter |
| 2020/0120866 A1 | 4/2020 | Conrad et al. |
| 2020/0245560 A1* | 8/2020 | Legault ................. B60W 20/15 |

FOREIGN PATENT DOCUMENTS

| | | |
|---|---|---|
| CN | 217825988 U | 11/2022 |
| DE | 846479 C | 8/1952 |
| DE | 202014005416 U1 | 8/2014 |
| DK | 9200037 U3 | 12/1993 |
| EP | 1527669 A1 | 5/2005 |
| EP | 2145520 A1 | 1/2010 |
| EP | 2248409 A1 | 11/2010 |
| EP | 2491781 A1 | 8/2012 |
| EP | 3282826 A1 | 2/2018 |
| EP | 3476195 A1 | 5/2019 |
| FR | 2936395 A1 | 4/2010 |
| JP | H0591237 A | 4/1993 |
| JP | 2556136 B2 | 11/1996 |
| JP | 2859123 B2 | 2/1999 |
| JP | H11225534 A | 8/1999 |
| JP | 2000037123 A | 2/2000 |
| JP | 2001204218 A | 7/2001 |
| JP | 3227063 B2 | 11/2001 |
| JP | 2002204609 A | 7/2002 |
| JP | 3418341 B2 | 6/2003 |
| JP | 4304455 B2 | 7/2009 |
| JP | 5685385 B2 | 3/2015 |

* cited by examiner

300

302A

300

302B

CONFIGURABLE LIFT ACTUATOR FOR LAWN MOWER CUTTING UNIT

TECHNICAL FIELD

This disclosure relates in general to the field of lawn mowers and, more particularly, though not exclusively, to a configurable lift actuator system for lawn mower cutting unit.

BACKGROUND

Industrial lawn mowers, such as those used for maintaining golf courses, may include one or more of cutting units that may be selectively vertically raised and lowered depending on the mode of operation of the mower. Actuators may be provided for controlling the vertical position of the cutting units in response to appropriate commands or control signals.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements.

DETAILED DESCRIPTION

Figure 1A:
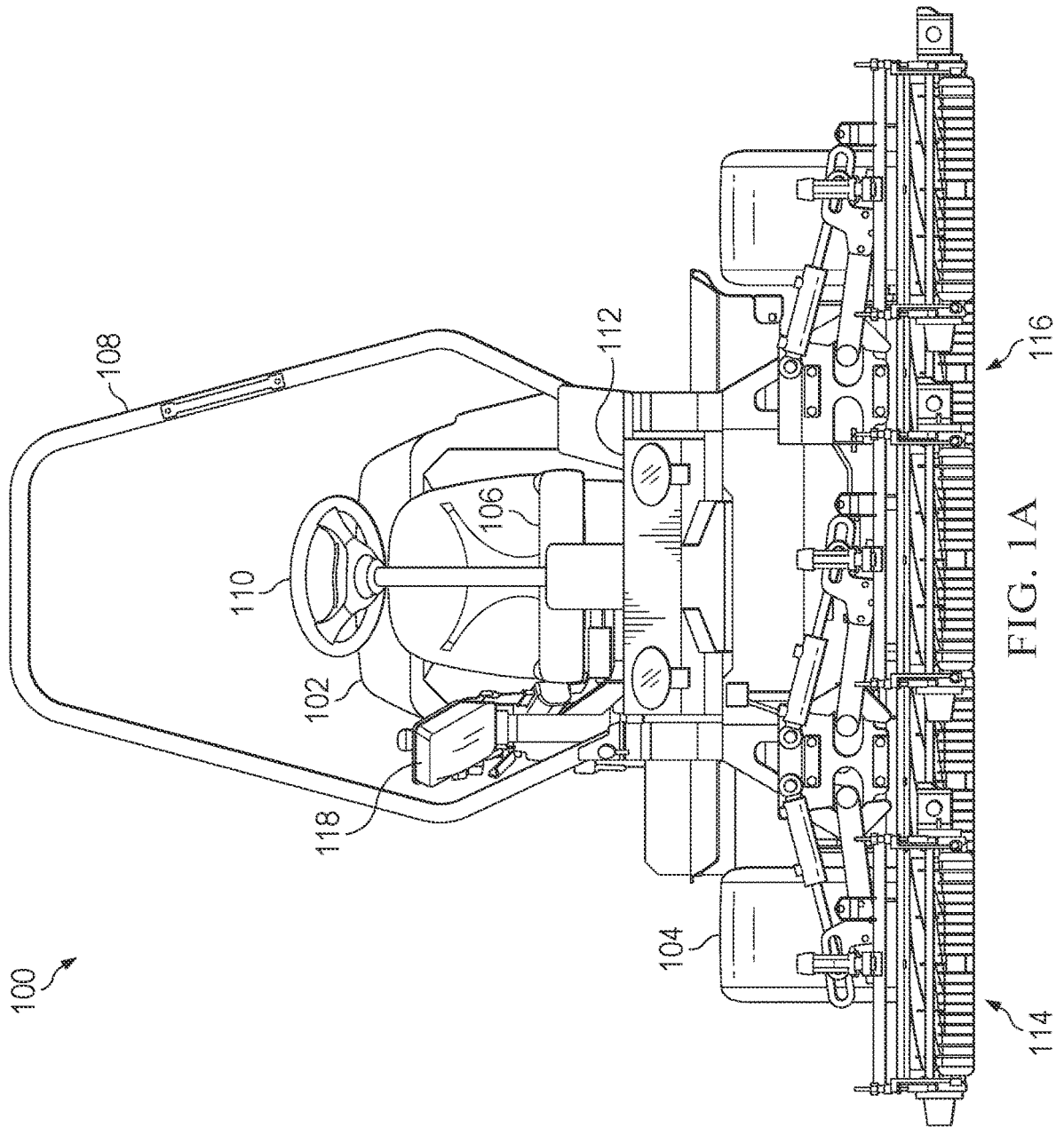
FIGS. 1A-1B illustrate an example lawn mower in which embodiments described herein may be implemented.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", "raised", "lowered", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Additionally, as referred to herein in this specification, the terms "forward," "aft," "inboard," and "outboard" may be used to describe relative relationship(s) between components and/or spatial orientation of aspect(s) of a component or components. The term "forward" may refer to a spatial direction that is closer to a front of a vehicle relative to another component or component aspect(s). The term "aft" may refer to a spatial direction that is closer to a rear of a vehicle relative to another component or component aspect (s). The term "inboard" may refer to a location of a component that is within the fuselage of a vehicle and/or a spatial direction that is closer to or along a centerline of the vehicle (wherein the centerline runs between the front and the rear of the vehicle) or other point of reference relative to another component or component aspect. The term "outboard" may refer to a location of a component that is outside the fuselage of a vehicle and/or a spatial direction that is farther from the centerline of the vehicle or other point of reference relative to another component or component aspect.

Further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying figures.

Figure 1B:
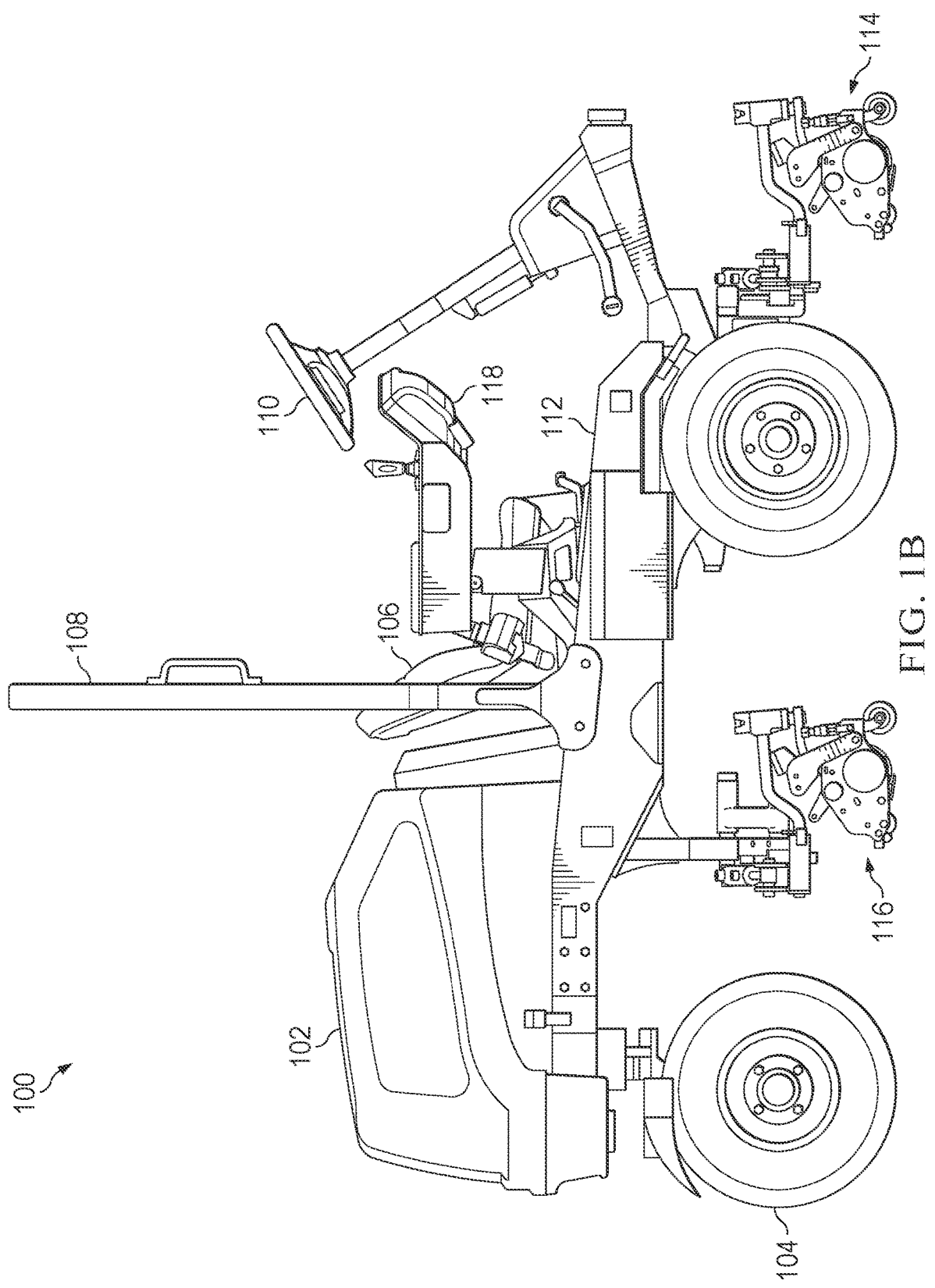

FIGS. 1A-1B respectively illustrate side and front plan views of an example embodiment of a lawn mower 100. In particular embodiments, lawn mower 100 may be used for mowing a golf course or other large area of grass or lawn. Lawn mower 100 may include an engine cover/hood 102, ground-engaging members 104, a seat 106, a roll-over protection bar 108, a steering wheel 110, a foot-rest 112, forward cutting units, or cutting decks, 114 and rear cutting units, or cutting decks, 116. In some embodiments, the front row includes three cutting decks 114 and the back row includes four cutting decks 116 (not all of which are visible in FIGS. 1A and 1B). In alternative embodiments, mower 100 may include more or fewer front and/or rear cutting decks. FIG. 1A illustrates cutting units 114, 116, in a raised position, in which cutting units are not active and which may be suitable for transportation of mower 100 over areas that are not to be mowed. FIG. 1B illustrates cutting units 114, 116, in a transport position, in which cutting units are raised to enable mower 100 to transit easily over a surface. A control panel 118 is also provided for enabling an operator (e.g., seated in seat 106) to control various modes of operations of mower 100 in accordance with features of embodiments described herein. In particular embodiments, control panel 118 may include one or more of a display unit including a graphical user interface (GUI) and a switch panel including one or more physical switches and/or joysticks, for example. Display unit may comprise a touch-screen.

Hydraulic cylinders have conventionally been employed as lift actuators in mechanisms for lifting and lowering cutting units on a mower, such as cutting units 114, 116. An advantage of hydraulic cylinders is that fluid can be caused to flow freely into and out of the cylinder by enabling a path for the hydraulic oil back to a tank via a solenoid valve, or float valve, such that the actuator can be back driven, allowing the cutting unit to float over a surface being mowed. In particular embodiments, a lift ram comprising a hydraulic cylinder may be directly coupled to the cutting unit, resulting in a highly responsive lifting and lowering mechanism.

In accordance with features of embodiments described herein, electric actuators may deployed for selectively lifting and lowering a cutting units in response to control signals from a control system, which may include a master control unit connected to the lift actuators via a controller area network (CAN) bus. Such electric actuators cannot be back driven and may therefore be connected to cutting units via a lift pin through a slot provided in a float plate attached to a lift arm of the cutting unit, thereby allowing the cutting unit to freely float and follow contours of the surface being mowed while maintaining the lift actuator in a single commanded position. In order to ensure maximum contour, the lift pin of the electric lift actuator may be positioned near the middle of the slot to allow the cutting unit to move freely up and down within the maximum contour range. As a result, when a lift command is received by the lift actuator, there is a delay between movement of the actuator and lifting of the cutting unit while the actuator moves to the upper end of the slot.

In certain situations, such a delay could be operationally significant. For example, when the mower is moving at 12 kilometers per hour (kph), a one second lift delay results in the mower traveling 3.3 meters (m) before the cutting unit is lifted. This may be accounted for by an experienced operator issuing the lift command earlier than required; however, an inexperienced operator may not be aware of the situation and hence may not issue the lift command sufficiently early to avoid mowing an area unintentionally.

Embodiments described herein address the aforementioned concerns and enable an operator to configure multiple mowing, or operating, positions corresponding to different positions of the actuator. As a result, a first (in some instances default) operating position may correspond to a first actuator position in which the lift pin is positioned in the middle of the slot, as described above, and a second operating position may correspond to a second actuator position in which the lift pin is positioned nearer to the top of top of slot (i.e., the end of the slot nearest the actuator). Operation in the second operating position may impact the cutting units' contouring capabilities but will decrease the time it takes for the cutting unit to be raised in response to a lift command. Embodiments described herein further enables an operator to optimize the position of the actuator with regard to a mowing surface (e.g., a relatively hilly section of a golf course, which may require more contouring, versus a flat section of the golf course, which may not), such that a less experience operator does not have to switch between positions to optimize lift speed without sacrificing the contour following requirements of a facility (e.g., a golf course) where the mower is being used.

For more experienced operators, the ability to quickly switch between the multiple (e.g., two) actuator positions may be important as some areas of the same facility may be particularly undulating while other areas may be extremely flat. Embodiments described herein enables an operator to quickly tailor the mower's characteristics for optimum performance in all conditions.

In particular embodiments, as described in greater detail below, a soft key may be provided on the control panel 118 for enabling an operator to quickly and easily switch between first and second actuator positions.

Figure 2:
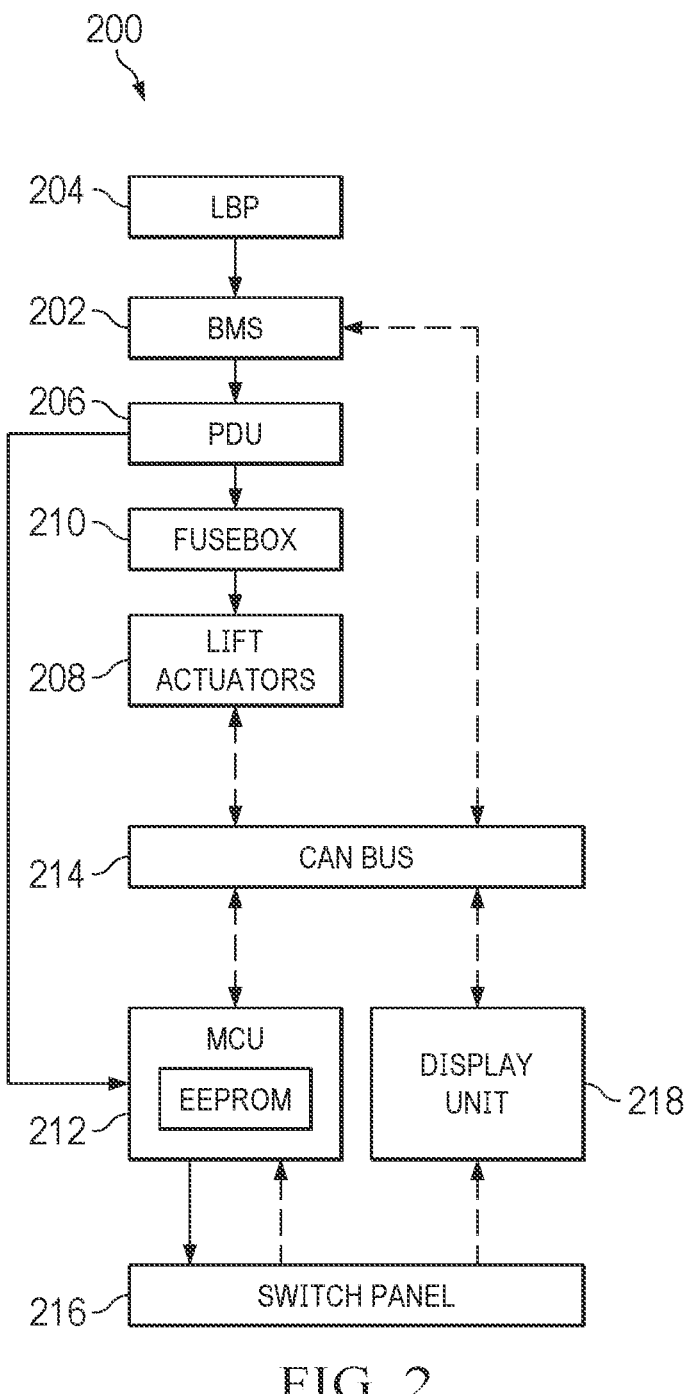
FIG. 2 illustrates an example system block diagram of a lawn mower control system according to features of embodiments described herein.

Referring now to FIG. 2, illustrated therein is a block diagram of an example control system 200 for a lawn mower, such as mower 100 (FIG. 1). It will be recognized that in FIG. 2 solid arrows represent power flow, whereas dashed arrows represent communications flow. In accordance with features of embodiments described herein, upon ignition of a mower, assuming specified safety considerations are satisfied, a battery management system (BMS) 202 may distribute power from a lithium battery pack (LBP) 204, which in some embodiments may be a 48 volt DC LPB, to a power distribution unit (PDU) 206. PDU 206 may distribute power to one or more lift actuators 208 via a fuse box 210. A master control unit (MCU) 212 may control the position, speed, soft start, soft stop, and current limit of each of lift actuators 208 by providing one or more control signals (or commands) to lift actuators on a controller area network (CAN) bus 214. Each lift actuator 208 reports its actual position, actual speed, actual current, error state, and status back to MCU 212 via CAN bus 214.

In particular embodiments, control system 200 initially causes mower to operate in a TRANSPORT mode, in which lift actuators 208, in response to commands from MCU 212, fully retracts, or lifts, the cutting units. In some embodiments, TRANSPORT mode corresponds to approximately 0% of full lift actuator extension (i.e., substantially no extension). Mower remains in TRANSPORT mode until a MOW mode is activated by MCU 212, e.g., in response to signals generated to MCU in response to activation of a switch on a switch panel 216, which together with display unit 218 may comprise a control panel similar to control panel 118 (FIGS. 1A and 1B), after confirming that relevant safety conditions are satisfied.

In accordance with features of embodiments described herein, when mower is in MOW mode, lift actuators 208 may be in one of three positions, including a crosscut position, a first mow position, and a second mow position. Crosscut position is the position from which lift actuators are lowered and to which lift actuators are raised and is the position that MCU 212 commands the lift actuators 208 to when MOW mode is first activated. In particular embodiments, default crosscut position is approximately 11-12% of full actuator extension; however, this value can be changed by adjusting configuration setting, e.g., via a user interface of display unit 218. Configuration settings such as this and others may be saved in an EEPROM 220 (or other appropriate memory device) of MCU 212 provided for that purpose.

Crosscut position enables an operator to partially lift or lower the cutting units to a pre-determined position prior to reaching either fully retracted position (as in TRANSPORT mode) or fully lowered to ground surface (as in first and second mow positions). The purpose of crosscut position is to enable the mower to transit a short distance from one mowing area to another without cutting the area in between and to enable the cutting units to be returned to cutting position without incurring the delay of fully lifting and lowering the cutting units to and from TRANSPORT mode position. An example of a situation in which crosscut position may be useful would be to avoid running the cutting units over a graveled footpath that runs between two areas of grass to be cut.

In accordance with features of embodiments described herein, in response to an indication from an operator that the cutting units are to be lowered to cutting position (e.g., using a joystick or activating a switch provided on switch panel 216), MCU 212 causes lift actuators 208 to fully extend, thereby transitioning the cutting units from the crosscut position to one of the two mowing, or operating, positions. In particular embodiments, this may be accomplished by the MCU 212 providing appropriate control instructions to lift actuators 208 over CAN bus 214.

Embodiments described herein allow the operator to configure multiple operating positions using the GUI of the display unit 218, which may include a touch screen. Although two operating positions are illustrated and described herein, it is understood that more than two operating positions are well within the spirit and scope of the disclosure. Once configured, the positions are transmitted to MCU 212 where they are stored in EEPROM 220. MCU 212 may also recall the last configuration of the mower at shutdown, as well as which of the two mowing positions was being used such that upon the next use of the mower, the operator may continue with the settings previously selected.

Figure 3A:
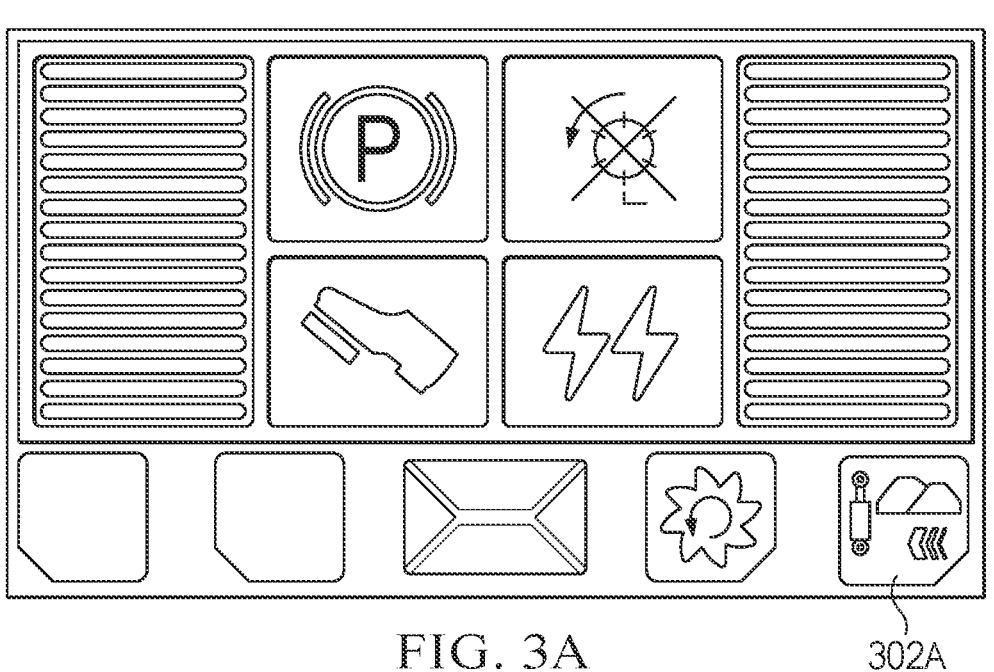
FIGS. 3A and 3B illustrate an example of a graphical user interface (GUI) for entering input to a lawn mower control system according to features of embodiments described herein.
Figure 3B:
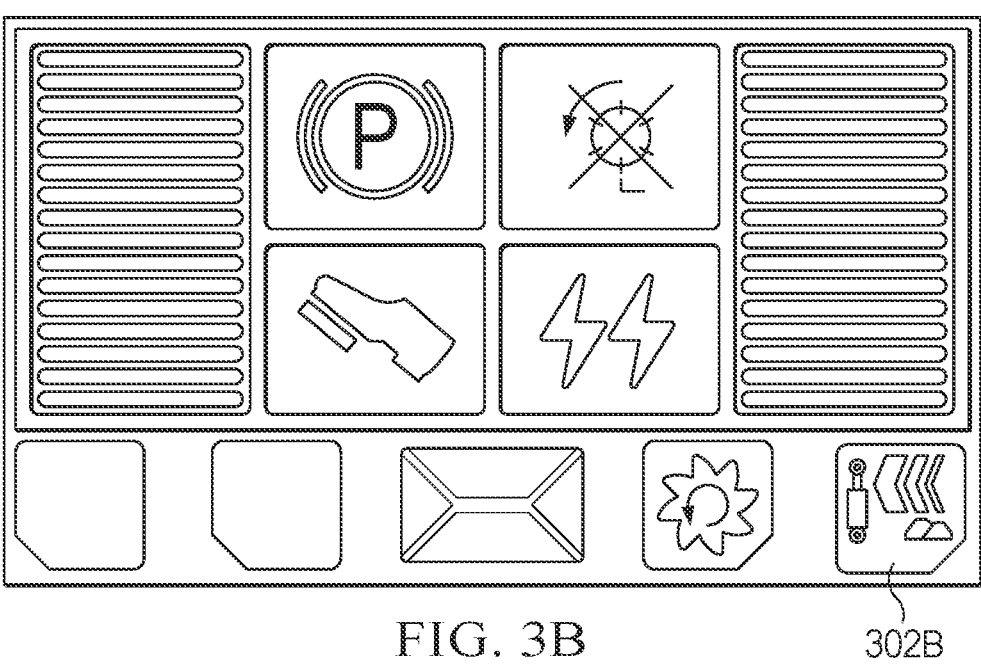

Referring now also to FIGS. 3A and 3B, illustrated therein is an example GUI 300 of display unit 218 for in configuring and controlling the position of the lift actuators. When actively cutting in MOW mode, the operator can use a dedicated soft key 302 on the GUI 300 to change between the first mowing position (as indicated by the state of soft key 302 as shown in FIG. 3A) and the second mowing position (as indicated by the state of soft key 302 as shown in FIG. 3B). When toggled, the display unit 218 sends input signals to MCU 212 to use the alternative mow position from that operator configuration. MCU 212 then sends control signals to lift actuators 208 over CAN bus 214 to cause the lift actuators to change position.

In various embodiments, control system 200 may include more, fewer, or other components than shown in FIG. 2. For example, control system 200 may further include additional processors, input/output (I/O) devices, communications links, and memory. Control system 200 may be operable to perform one or more operations of various embodiments as described herein. Although the embodiment shown provides one example of control system 200 that may be used with other embodiments, such other embodiments may utilize control systems other than control system 200. Additionally, embodiments may also employ multiple control systems, such as control system 200. Control system 200 may exist wholly or partially on-board the mower, off-board the mower (e.g., in a ground station), or a combination of the two.

MCU 212 may be implemented as a processor or other device operable to execute logic contained within a medium. Examples of such devices include one or more microprocessors, one or more applications, and/or other logic. Control system 200 may include one or multiple such devices. Control system 200 may include input/output devices including any device or interface operable to enable communication between control system 200 and external components, including communication with an operator or another system. Example input/output devices may include, but are not limited to, a mouse, keyboard, display, and printer.

Network interfaces may be provided to facilitate communication between control system 200 and another element of a network, such as other computer systems. Network interfaces may connect to any number and combination of wireline and/or wireless networks suitable for data transmission, including transmission of communications. Network interfaces may, for example, communicate audio and/or video signals, messages, internet protocol packets, frame relay frames, asynchronous transfer mode cells, and/or other suitable data between network addresses. Network interfaces connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Control system 200 may include additional memory devices comprising any suitable storage mechanism which may store any data for use by control system 200. Memory may comprise one or more tangible, computer readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory stores logic for facilitating operation of control system 200. Logic may include hardware, software, and/or other logic and may be encoded in one or more tangible, non-transitory media and may perform operations when executed by a computer. Logic may include a computer program, software, computer executable instructions, and/or instructions capable of being executed by control system 200. Example logic may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic may also be embedded within any other suitable medium without departing from the scope of the invention.

Figure 4A:
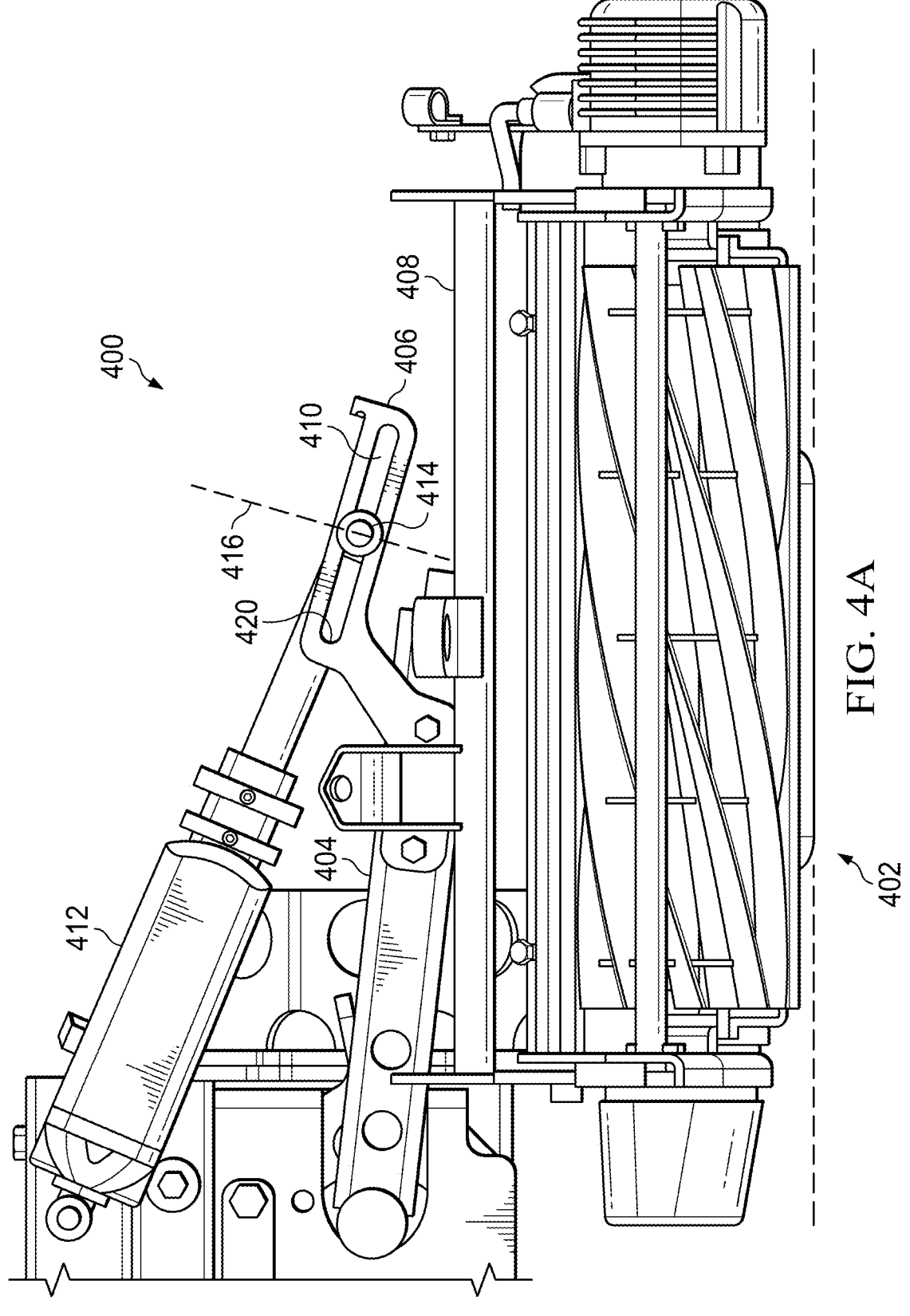
FIGS. 4A-4D illustrate an example lawn mower cutting assembly according to features of embodiments described herein.
Figure 4B:
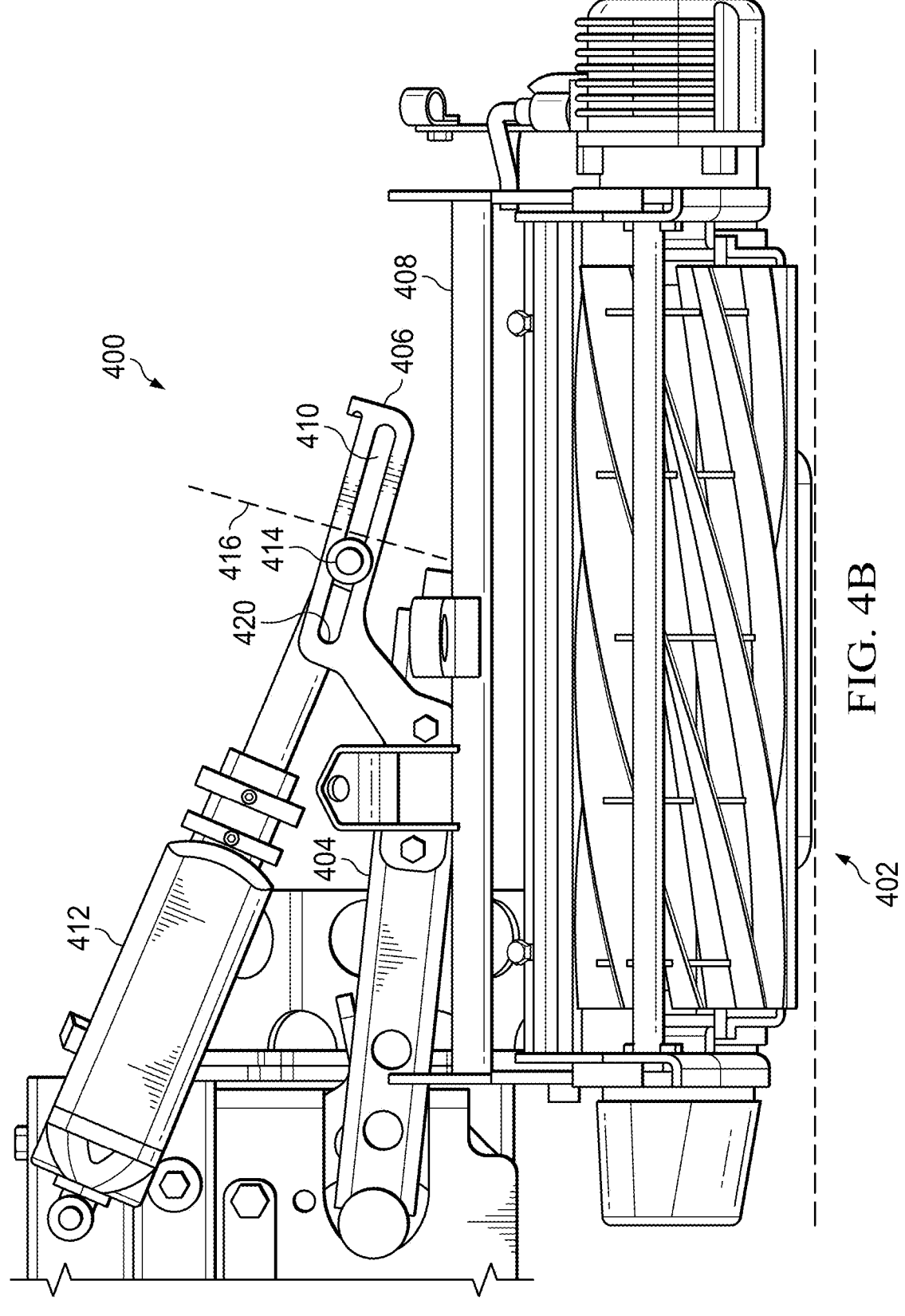
Figure 4C:
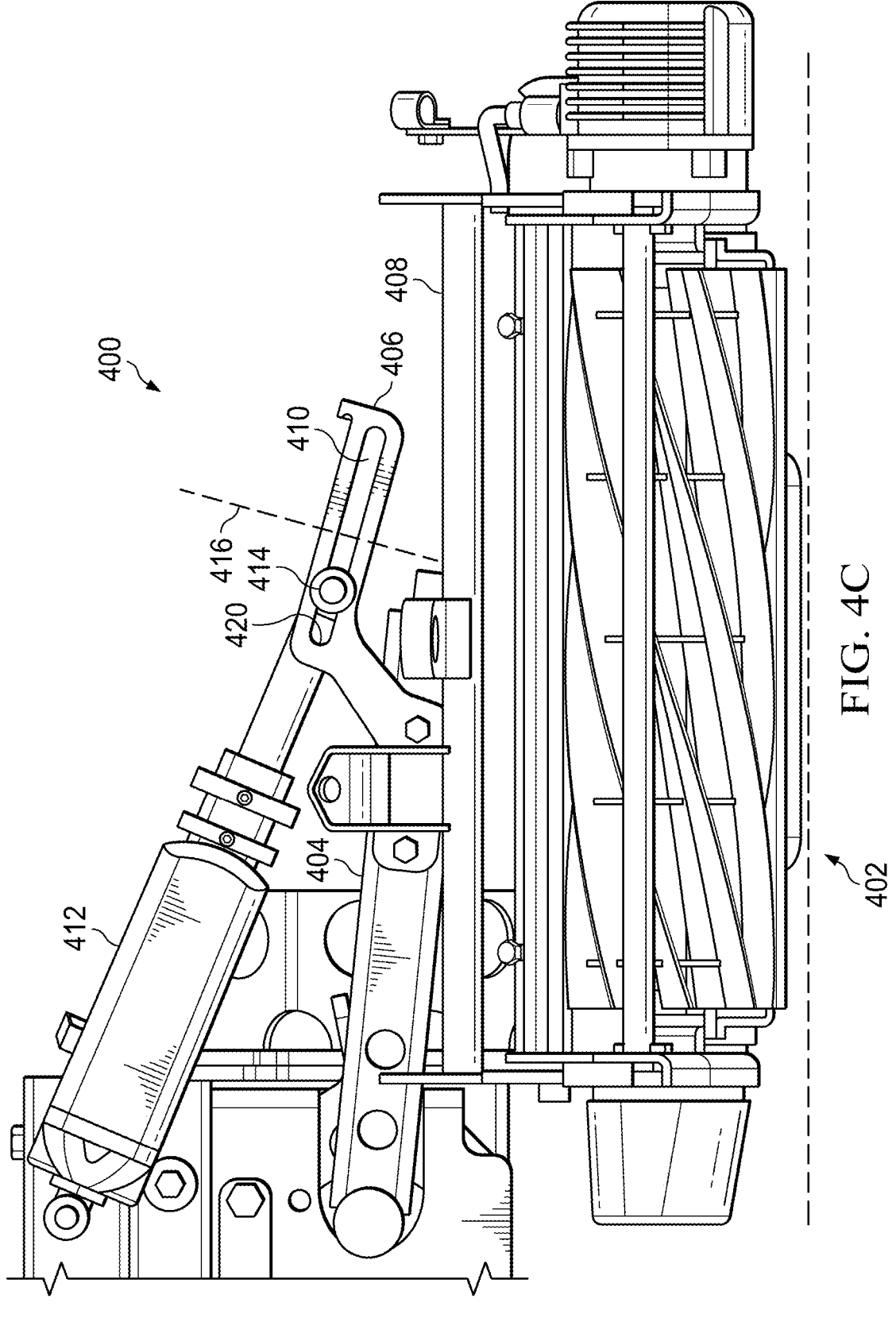

FIGS. 4A-4C illustrate a cutting assembly 400 embodying features of embodiments described herein. In particular embodiments, cutting assembly 400 may be deployed in a mower such as mower 100 (FIG. 1). Each of FIGS. 4A-4C illustrate cutting assembly in different positions. FIG. 4A illustrates cutting assembly 400 in the first mowing position, in which a cutting unit 402 of cutting assembly 400 may be actively used to mow a surface being transited by mower 100. In particular embodiments, cutting unit 402 is a rotary cutting unit comprising a plurality of blades. Cutting unit 402 is connected to a lift arm 404 including a float plate 406 via a yoke 408. A slot 410 is provided in float plate 406 for purposes to be described in greater detail below.

In accordance with features of embodiments described herein, an electric lift actuator 412 is provided for selectively raising and lowering unit 402 in response to commands from a controller, such as MCU 212 (FIG. 2). As shown in FIG. 4A, a lift pin 414 of lift actuator 412 is retained within the slot 410 and, in the illustrated mode, is positioned proximate a center of the slot, as represented by a dashed line designated by a reference numeral 416. In particular embodiments, this is the maximum extension of lift actuator 412. As previously noted, FIG. 4A illustrates cutting assembly 400 as being in the first mowing position in which a maximum contour range can be achieved. In some embodiments, the first mowing position may be the default mowing position for mower 100 (FIG. 1).

Referring now to FIG. 4B, cutting assembly 400 is illustrated therein in the second mowing position, in which the cutting unit 402 of the cutting assembly 400 may be actively used to mow a surface being transited by mower 100 (FIG. 1). As shown in FIG. 4B, lift pin 414 of lift actuator 412 is positioned between center 416 of slot 410 and an end 420 of slot proximate actuator 412. As compared to the first mowing position shown in FIG. 4A, the second mowing position provides an optimized lift response, as lift pin 414 is closer to end 420 of slot 410 and thus provides less lift delay; however, proximity of lift pin 414 to end 420 of slot reduces contour ability of cutting unit 402 and therefore, the second mowing position is more optimal for flat surfaces than for rolling surfaces, for example.

Referring now to FIG. 4C, the cutting assembly 400 is illustrated therein in a lift position. In particular, FIG. 4C illustrates the cutting assembly 400 at a point just before the cutting unit 402 is lifted by actuator 412 off the surface being transited by mower 100 (FIG. 1). As shown in FIG. 4C, lift pin 414 of lift actuator 412 is positioned proximate the end 420 of slot 410 proximate actuator 412. This position is approximately 50% of maximum lift actuator extension. Further retraction of lift pin 414 toward lift actuator 412 will result in lifting of cutting unit 402 from the cutting surface.

Figure 4D:
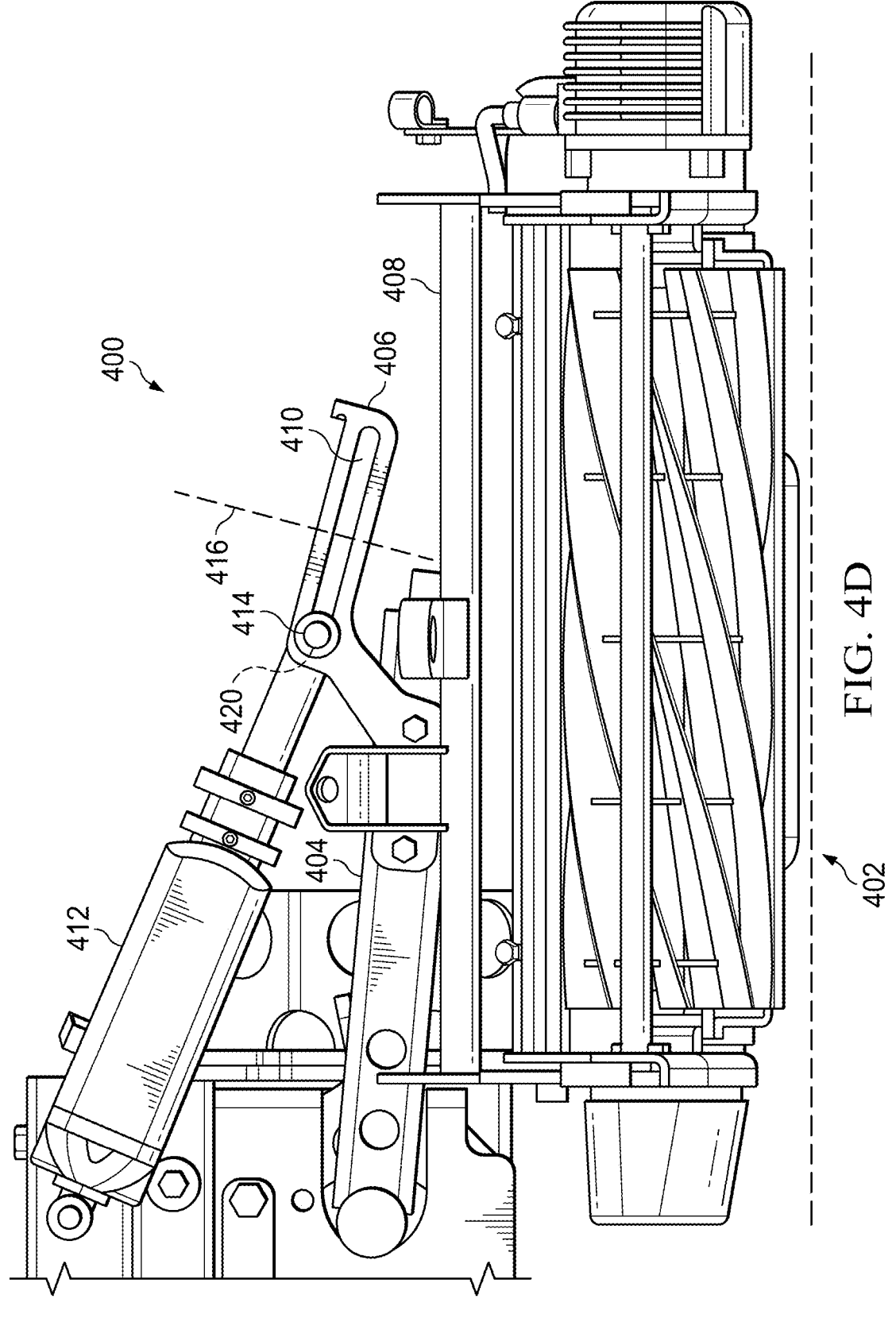

Referring now to FIG. 4D, the cutting assembly 400 is illustrated therein in a transport position. In particular, FIG. 4D illustrates the cutting assembly 400 at a point after the cutting unit 402 has been completely lifted by actuator 412 and the actuator is in a non-extended, or fully retracted, position (i.e., 0% of maximum lift actuator extension). As shown in FIG. 4D, lift pin 414 of lift actuator 412 is positioned at the end 420 of slot 410 proximate actuator 412.

Example 1 provides a cutting assembly for a mower, the cutting assembly including a cutting unit including a plurality of blades; a lift arm including a float plate, wherein the cutting unit is connected to the lift arm via a yoke and wherein a slot is provided in the float plate; a lift actuator including a lift pin disposed in the slot; and a control system for selectively controlling a position of the lift actuator; wherein the position of the lift actuator includes one of a first operating position, in which the lift pin is positioned proximate a center of the slot and a second operating position, in which the lift pin is positioned between the center of the slot and an end of the slot proximate a body of the actuator.

Example 2 provides the cutting assembly of example 1, wherein the second position is configurable.

Example 3 provides the cutting assembly of example 1, wherein the control system includes a master control unit (MCU) for issuing commands to the lift actuator for controlling the position of the lift actuator.

Example 4 provides the cutting assembly of example 1, wherein the cutting unit includes a rotating cutting unit.

Example 5 provides the cutting assembly of example 1, wherein the lift actuator includes an electric actuator.

Example 6 provides the cutting assembly of example 1, wherein the position of the actuator further includes a crosscut position in which the lift actuator is extended less than a maximum distance and more than a minimum distance.

Example 7 provides the cutting assembly of example 1, wherein the position of the actuator further includes a transport position in which the lift actuator is fully retracted.

Example 8 provides the cutting assembly of example 1, wherein the cutting assembly is electrically connected to a control panel for selecting the position of the actuator, wherein the control panel includes a touch screen.

Example 9 provides mower including a plurality of cutting assemblies, wherein each of the cutting assemblies includes a cutting unit including a plurality of blades; a lift arm including a float plate, wherein the cutting unit is connected to the lift arm via a yoke and wherein a slot is provided in the float plate; and an electric lift actuator including a lift pin disposed in the slot; and the mower further includes a control system for selectively controlling a position of each of the lift actuators in response to user input provided via a graphical user interface (GUI); wherein for each of the lift actuators, the position of the lift actuator includes one of a first operating position, in which the lift pin is positioned proximate a center of the slot and a second operating position, in which the lift pin is positioned between the center of the slot and an ends of the slot proximate a body of the lift actuator; and wherein positions of the lift actuators are controlled collectively.

Example 10 provides the mower of example 9, wherein the second position is configurable using the GUI.

Example 11 provides the mower of example 10, wherein the user input is provided by pressing a soft key on the GUI.

Example 12 provides the mower of example 9, further providing a switch panel for providing input signals to the control system in response to user-activation of one of the switches, wherein the input signals indicate a desired mode of operation of the mower.

Example 13 provides the mower of example 9, wherein the control system includes a master control unit (MCU) for issuing commands to the lift actuators for controlling the positions of the lift actuators.

Example 14 provides the mower of example 9, wherein the position of the actuator further includes a crosscut position in which the lift actuator is extended less than a maximum distance and more than a minimum distance.

Example 15 provides the mower of example 9, wherein the position of the actuator further includes a transport position in which the lift actuator is fully retracted.

Example 16 provides a control system for a mower cutting assembly including a cutting unit, a lift arm connected to the cutting unit, wherein a slot is provided in the lift arm, and a lift actuator including a lift pin secured in the slot, the control system including an input device for receiving user input regarding a position of the lift actuator; and a master control unit (MCU) for receiving the user input from the input device and for selectively controlling a position of the lift actuator in accordance with the received user input; wherein the position of the lift actuator includes one of a first operating position, in which the lift pin is positioned proximate a center of the slot and a second operating position, in which the lift pin is positioned between the center of the slot and an end of the slot proximate a body of the actuator.

Example 17 provides the control system of example 16, further including a controller area network (CAN) bus, wherein the MCU selectively controls the position of the lift actuator using control signals provided to the lift actuator via the CAN bus.

Example 18 provides the control system of example 16, wherein the input device includes at least one of a switch, a joystick, and a display unit including a graphical user interface.

Example 19 provides the control system of example 18, wherein the display unit includes a touch screen.

Example 20 provides the control system of example 18, wherein the second operating position is configurable.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C. The terms "substantially," "close," "approximately," "near," and "about," generally refer to being within +/−5-20% of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−5-20% of a target value based on the context of a particular value as described herein or as known in the art.

The diagrams in the FIGURES illustrate the architecture, functionality, and/or operation of possible implementations of various embodiments of the present disclosure. Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure but may or may not necessarily be combined in the same embodiments.

As used herein, unless expressly stated to the contrary, use of the phrase "at least one of," "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first," "second," "third," etc., are intended to distinguish the particular nouns (e.g., blade, rotor, element, device, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of," "one or more of," and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A cutting assembly for a mower, the cutting assembly comprising:

a cutting unit comprising a plurality of blades;

a lift arm including a float plate, wherein the cutting unit is connected to the lift arm via a yoke and wherein a slot is provided in the float plate;

a lift actuator comprising a lift pin disposed in the slot; and a control system for selectively controlling a position of the lift actuator;

wherein the position of the lift actuator comprises a first mow position, in which the lift pin is in a first location proximate a center of the slot, a second mow position, in which the lift pin is in a second location between the center of the slot and an end of the slot proximate a body of the actuator, a crosscut position, in which the lift pin is in a third location between the second location and the end of the slot proximate the body of the actuator, and a transport position, in which the pin is in a fourth location proximate the end of the slot proximate the body of the actuator; and wherein each position is configurable.

2. The cutting assembly of claim 1, wherein the control system includes a master control unit (MCU) for issuing commands to the lift actuator for controlling the position of the lift actuator.

3. The cutting assembly of claim 1, wherein the cutting unit comprises a rotating cutting unit.

4. The cutting assembly of claim 1, wherein the lift actuator comprises an electric actuator.

5. The cutting assembly of claim 1, wherein when the lift actuator is in the crosscut position, the lift actuator is neither fully extended nor fully retracted.

6. The cutting assembly of claim 1, wherein when the lift actuator is in the transport position, the lift actuator is fully retracted.

7. The cutting assembly of claim 1, wherein the cutting assembly is electrically connected to a control panel for selecting the position of the actuator, wherein the control panel comprises a touch screen.

8. A mower comprising:

a plurality of cutting assemblies, wherein each of the cutting assemblies comprises:

a cutting unit comprising a plurality of blades;

a lift arm including a float plate, wherein the cutting unit is connected to the lift arm via a yoke and wherein a slot is provided in the float plate; and an electric lift actuator comprising a lift pin disposed in the slot; and a control system for selectively controlling a position of each of the lift actuators in response to user input provided via a graphical user interface (GUI);

wherein for each of the lift actuators, the position of the lift actuator comprises a first mow position, in which the lift pin is in a first location proximate a center of the slot, a second mow position, in which the lift pin is in a second location between the center of the slot and an end of the slot proximate a body of the actuator, a crosscut position, in which the lift pin is in a third location between the second location and the end of the slot proximate the body of the actuator, and a transport position, in which the pin is in a fourth location proximate the end of the slot proximate the body of the actuator, wherein each position is configurable using the GUI; and wherein positions of the lift actuators are controlled collectively.

9. The mower of claim 8, wherein the user input is provided by pressing a soft key on the GUI.

10. The mower of claim 8, further providing a switch panel for providing input signals to the control system in response to user-activation of one of the switches, wherein the input signals indicate a desired mode of operation of the mower.

11. The mower of claim 8, wherein the control system includes a master control unit (MCU) for issuing commands to the lift actuators for controlling the positions of the lift actuators.

12. The mower of claim 8, wherein when the lift actuator is in the crosscut position, the lift actuator is extended less than a maximum distance and more than a minimum distance.

13. The mower of claim 8, wherein when the lift actuator is in the transport position, the lift actuator is fully retracted.

14. A control system for a mower cutting assembly comprising a cutting unit, a lift arm connected to the cutting unit, wherein a slot is provided in the lift arm, and a lift actuator comprising a lift pin secured in the slot, the control system comprising:

an input device for receiving user input regarding a position of the lift actuator; and a master control unit (MCU) for receiving the user input from the input device and for selectively controlling a position of the lift actuator in accordance with the received user input;

wherein the position of the lift actuator comprises a first mow position, in which the lift pin is in a first location proximate a center of the slot, a second mow position, in which the lift pin is in a second location between the center of the slot and an end of the slot proximate a body of the actuator, a crosscut position, in which the lift pin is in a third location between the second location and the end of the slot proximate the body of the actuator, and a transport position, in which the pin is in a fourth location proximate the end of the slot proximate the body of the actuator, wherein each position is configurable.

15. The control system of claim 14, further comprising a controller area network (CAN) bus, wherein the MCU selectively controls the position of the lift actuator using control signals provided to the lift actuator via the CAN bus.

16. The control system of claim 14, wherein the input device comprises at least one of a switch, a joystick, and a display unit including a graphical user interface.

17. The control system of claim 16, wherein the display unit comprises a touch screen.

* * * * *